US005642290A

United States Patent [19]

Reilly et al.

[11] Patent Number: 5,642,290

[45] Date of Patent: Jun. 24, 1997

[54] EXPANSION CHASSIS FOR A VOLTAGE REGULATOR CONTROLLER

[75] Inventors: Joseph F. Reilly, Knightdale, N.C.; Michael A. Bellin, Brandon, Miss.; Carl J. Laplace, Jr., Raleigh; John J. Trainor, Wake Forest, both of N.C.

[73] Assignee: Siemens Energy & Automation, Inc., Alpharetta, Ga.

[21] Appl. No.: 120,720

[22] Filed: Sep. 13, 1993

[51] Int. Cl.[6] .......................... G05F 1/147; G05B 24/02

[52] U.S. Cl. .......................... 364/492; 323/257; 323/341

[58] Field of Search .......................... 364/492, 483; 322/33, 28; 323/272, 257, 258, 341; 315/379, 411; 360/78.1 B; 361/228

[56] References Cited

U.S. PATENT DOCUMENTS

| | | | |
|---|---|---|---|
| 3,743,921 | 7/1973 | Legg et al. | 323/258 |
| 4,000,443 | 12/1976 | Lever | 361/228 |
| 4,010,401 | 3/1977 | Yasumatsuya et al. | 315/379 |
| 4,293,812 | 10/1981 | Kubach et al. | 323/272 |
| 4,340,849 | 7/1982 | Kuhn | 322/28 |
| 4,419,619 | 12/1983 | Jindrick et al. | 364/483 |
| 4,733,158 | 3/1988 | Marchione et al. | 323/258 |
| 4,748,341 | 5/1988 | Gupta | 323/258 |
| 4,816,738 | 3/1989 | Nicolas | 323/258 |
| 4,853,608 | 8/1989 | Schrade | 323/258 |
| 4,860,145 | 8/1989 | Klingbiel | 323/258 |
| 4,888,545 | 12/1989 | Celenza et al. | 323/258 |
| 5,182,685 | 1/1993 | Krause et al. | 360/78.13 |
| 5,198,744 | 3/1993 | Kohl et al. | 322/33 |
| 5,247,682 | 9/1993 | Kondou et al. | 395/700 |
| 5,335,329 | 8/1994 | Cox et al. | 395/325 |
| 5,500,806 | 3/1996 | Bellin et al. | 364/492 |

*Primary Examiner*—Edward R. Cosimano
*Attorney, Agent, or Firm*—Richard M. Ludwin; Peter A. Luccarelli, Jr.; Donald M. Boles

[57] ABSTRACT

A voltage regulator controller having integral expansion ports. The expansion ports are provided by way of an I/O expansion chassis which is electrically coupled to the controller's microprocessor.

15 Claims, 7 Drawing Sheets

EXPANSION CHASSIS FOR A VOLTAGE REGULATOR CONTROLLER

I. BACKGROUND OF THE INVENTION a. Field of the Invention

This invention relates to circuit protection devices and related control systems.

b. Related Art

A step-type voltage regulator is a circuit protection device which is used to maintain a relatively constant voltage level in a power distribution system. Without such a regulator, the voltage level of the power distribution system could fluxuate significantly and cause damage to electrically powered equipment.

A typical configuration for this type of regulator (such as the Siemens JFR Series) is shown in FIG. 1. The conventional step-type voltage regulator 102 of FIG. 1 includes a microprocessor based controller 104 which generates signals that cause regulator tap changes in accordance with user configured thresholds and setpoints. The windings and other internal components that form the transformer are mounted in an oil filled tank 106. A tap changing mechanism (not shown) is sealed in a separate chamber in lower portion of the tank 106. The various electrical signals generated by the transformer are brought out to a terminal block 108 and external bushings S, SL, L for access. An indicator 110 is provided so that the position of the tap as well as its minimum and maximum positions can be readily determined.

A cabinet 112 is secured to the tank to mount and protect the voltage regulator controller 104. The cabinet 112 includes a door (not shown) and is sealed in a manner sufficient to protect the voltage regulator controller 104 from the elements. Signals carried between the transformer or tap changing mechanism and the voltage regulator controller 104 are carried via an external conduit 114.

From time to time, a manufacturer will make enhancements to the controller 104. These enhancements are typically provided by way of replacement of one or more of the controllers internal parts, modification of the controller's resident program code or by replacement of the controller itself. Upgrading or enhancing the functionality of a controller in this manner can be expensive and time consuming. Further, a user may wish to pick and choose from a number of enhancements.

SUMMARY OF THE INVENTION

The present invention includes a voltage regulator controller having integral expansion ports. In a preferred embodiment, the expansion ports are provided by way of an I/O expansion chassis which is electrically coupled to the controller's microprocessor.

II. BRIEF DESCRIPTION OF THE DRAWINGS

Like reference numerals appearing in more than one figure represent like elements.

III. DETAILED DESCRIPTION OF THE PREFERRED EMBODIMENT

Figure 1:
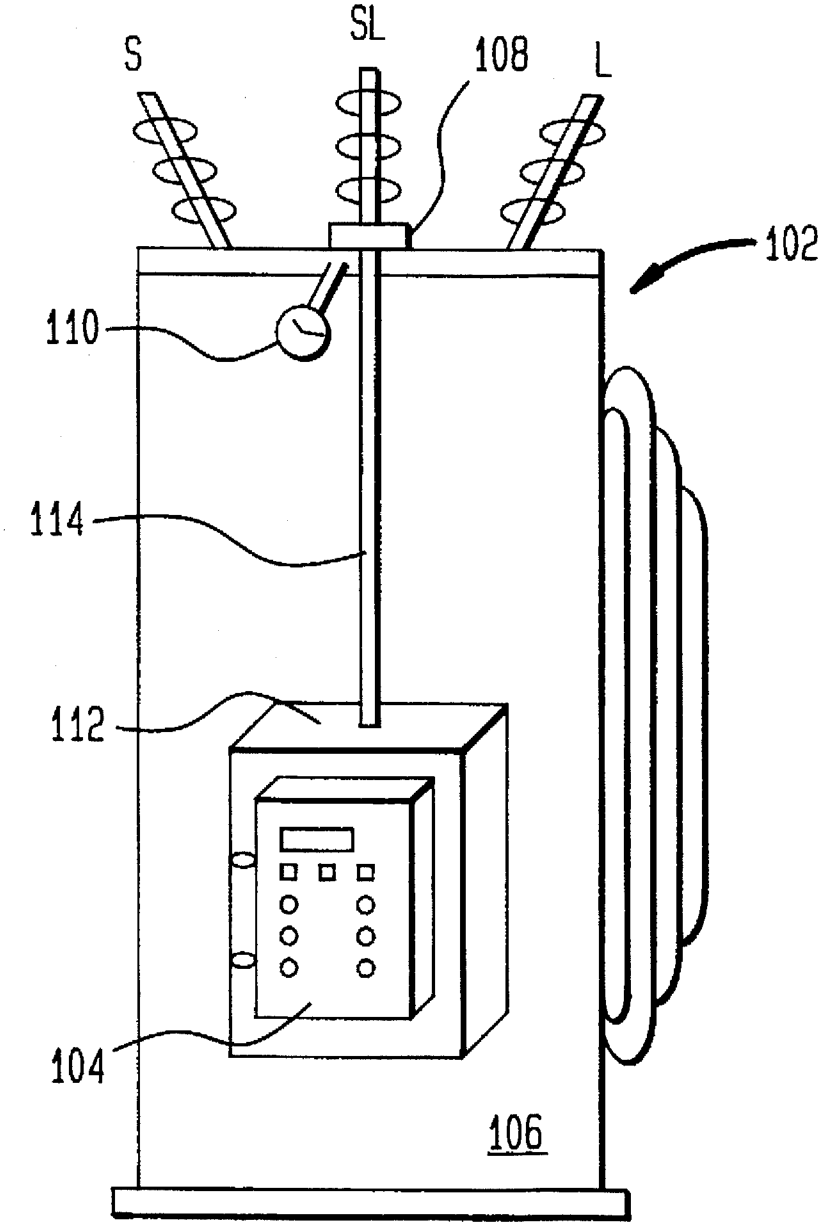
FIG. 1 PRIOR ART
FIG. 1 shows a prior art voltage regulator and controller.
Figure 2:
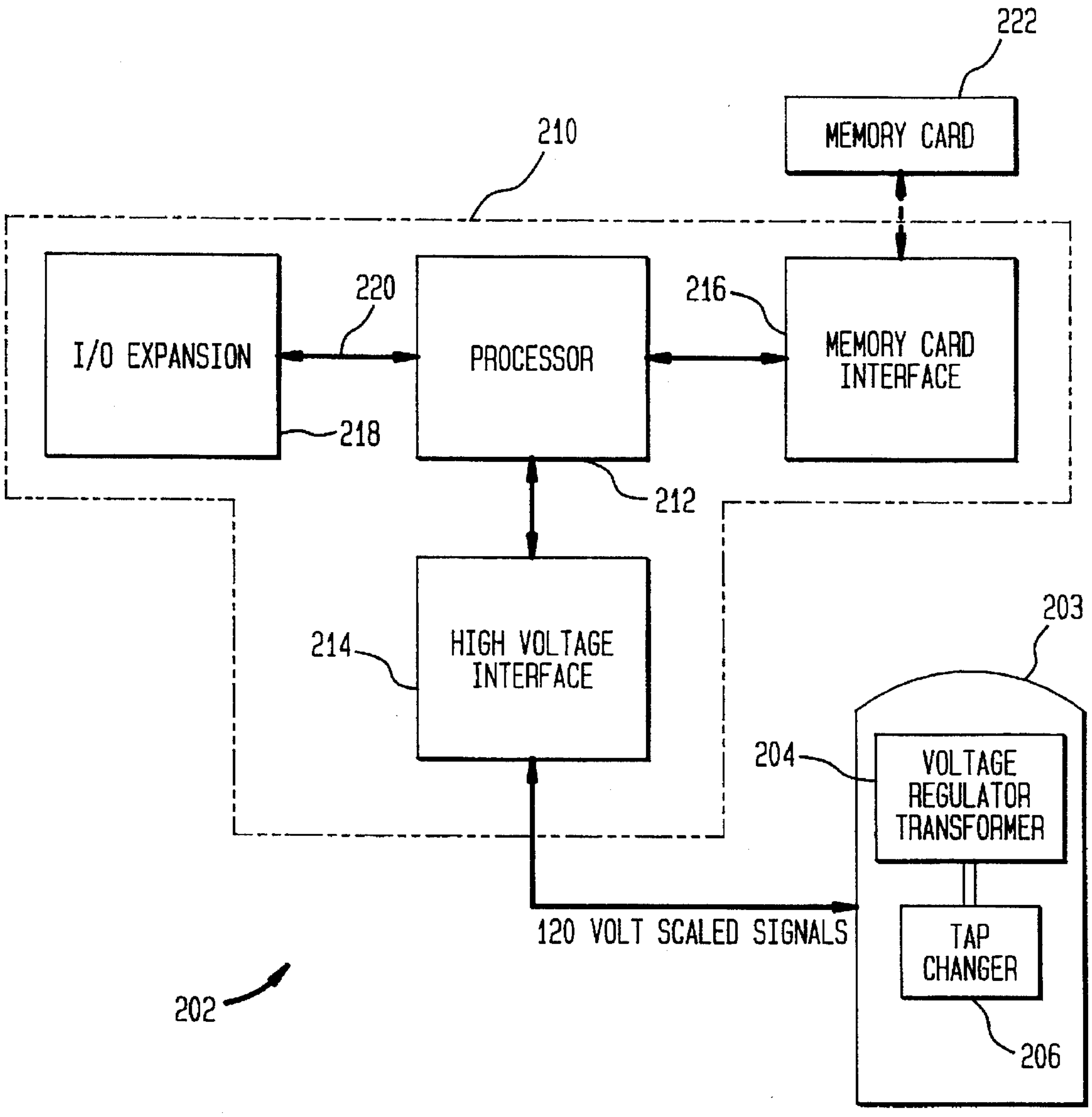
FIG. 2 shows a voltage regulator controller according to the principles of the present invention and its connection to a step-type voltage regulator.

A voltage regulator controller according to the principles of the present invention will now be described by reference to FIGS. 2 through 5.

The voltage regulator system 202 includes a conventional oil filled tank 203 which houses a multi-tap transformer 204 and an associated tap changer 206. The tap changer 206 is controlled by a voltage regulator controller 210 which receives signals indicative of voltage and current in the windings of the transformer 204 and conventionally generates tap control signals in accordance with user programmed set-points and thresholds for these signals.

The voltage regulator controller 210 includes a processor 212, a high voltage interface 214 and a memory card interface 216. In accordance with an embodiment of the present invention, the voltage regulator also includes an I/O expansion chassis 218 which is coupled to the processor 212 by way of a SPI bus 220 carried on a cable.

The processor 212 generates digital control signals based on internal program code and user selected parameters entered (by a user) via the controllers front panel. In operation, high voltage signals are generated by the voltage regulator 202. These signals are scaled down via internal transformers (not shown) and provided to the high voltage interface 214. The high voltage interface 214, in turn, further scales the transformed down signals for reading by an analog to digital converter (shown in FIG. 3) within the processor 212. The data fed back from the voltage regulator 202 is used by the processor 212 to make tap change control decisions and to provide indication of various conditions to a user.

The memory card interface 216 is disposed in the controller housing so that it is externally accessible via a slot formed in the housing wall. Field changes to the controller's configuration information or the processor's resident program can be made by a user plugging a memory card 222 into the memory card interface 216 and invoking a command from the regulator controller's keypad. The memory card 222 can be left plugged in to collect data or provide a control program, or it can be inserted briefly to transfer information to or from the controller 210.

Figure 3:
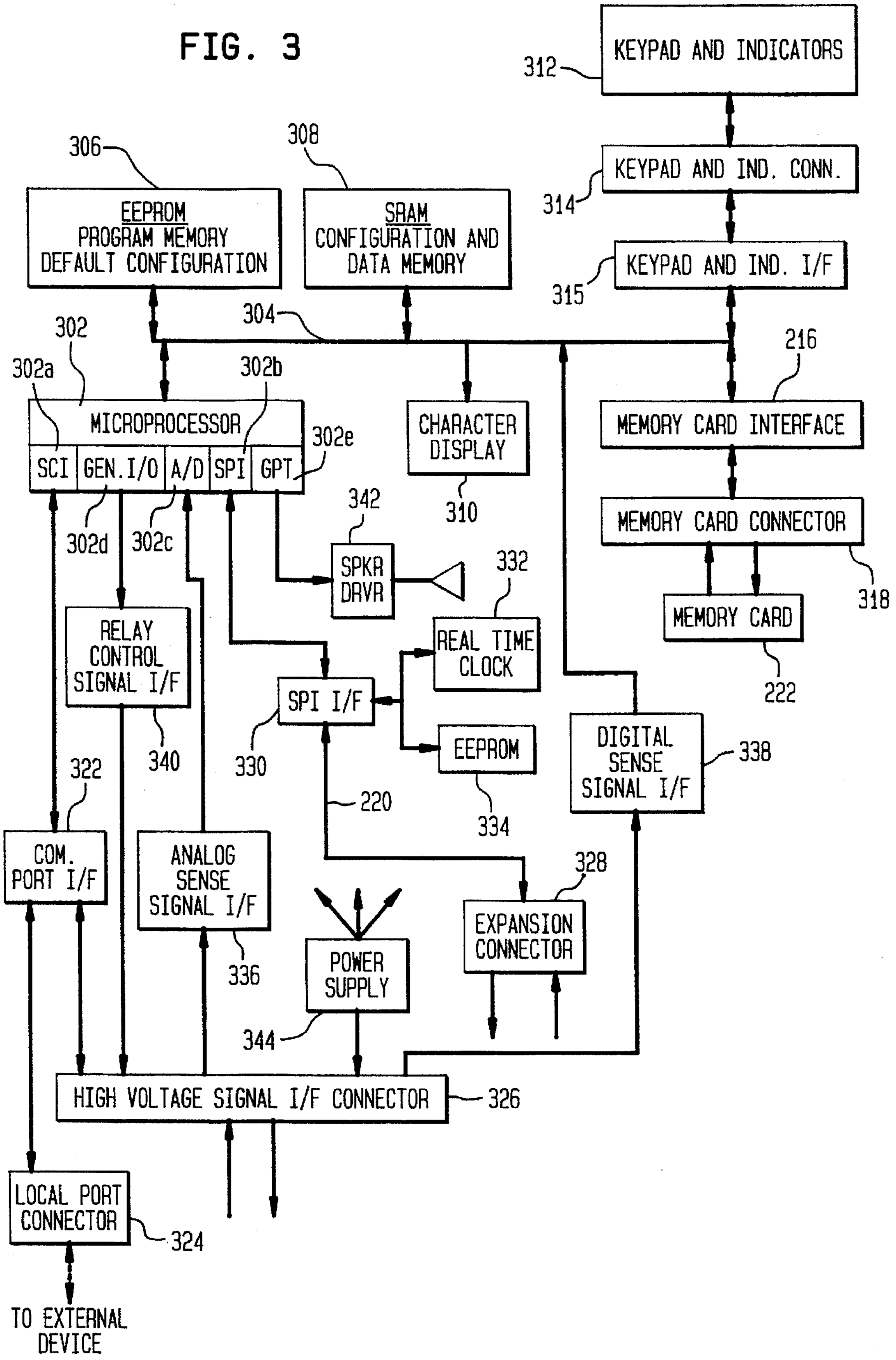
FIG. 3 is a more detailed diagram of the processor section of FIG. 2 showing its connection to a personality module and the memory interface.

A more detailed block diagram of the processor 212 and its interconnection with the memory card interface 216 and memory card 222 is illustrated in FIG. 3.

The processor 212 includes a microprocessor 302 (for example, a Motorola 68HC16) which is coupled to the other processor elements by way of a common bus 304. An electrically erasable programmable read only memory (EEPROM) 306 includes the microprocessor's program instructions and default configuration data. A static type random access memory (SRAM) 308 stores user programmed configuration data and includes an area for the microprocessor 302 to store working data. The microprocessor 302 also communicates with an alphanumeric character display 310, a keypad and indicators 312 and the memory card interface 216.

The keypad/indicators 312 are coupled to the bus 304 via a connectors 314 and a bus interface 315. As previously described, a memory card 222 can be coupled to the bus 304 by way of a conventional PCMCIA standard interface 216 and connector 318.

Operational parameters, setpoints and special functions including metering parameters and local operator interfacing are accessed via the keypad 312. The keypad is preferably of the membrane type however any suitable switching device can be used. The keypad provides single keystroke access to regularly used functions, plus quick access (via a menu arrangement) to all of the remaining functions.

The microprocessor 302 includes an SCI port **302*a* which is connected to a communication port interface 322. The communication port interface 322 provides the SCI signals to an external local port 324 (accessible on the controller's front panel). An isolated power supply for the communication port interface 322 is provided by the high voltage interface 214 via a high voltage signal interface connecter 326**.

The communication port interface 322 supports transfer of data in both directions, allowing the controller to be configured via a serial link, and also provides meter and status information to a connected device. In addition to supporting the configuration and data retrieval functions for remote access, the communication port interface 322 supports uploading and/or downloading the program code for the microprocessor 302.

The microprocessor 302 also includes a SPI port **302*b* which is connected to an expansion connector 328 by way of an SPI interface 330. The expansion connector 328 brings the SPI bus 220 out to the I/O expansion chassis 218 via a cable. Other devices that reside on the SPI bus include a real time clock (RTC) 332 and a serial EEPROM 334. The serial EEPROM 334 stores user programmed configuration data. The user programmed configuration data is downloaded to the SRAM 308 by the microprocessor 302 when the processor 212 is initialized. The SRAM copy is used, by the microprocessor, as the working copy of the configuration data. Whenever a configuration change is made, the new information is stored in both the SRAM 308 and in the serial EEPROM memory 334. The real time clock 332 is programmed and read by the microprocessor 302**.

The high voltage signal interface connector 326 provides a mating connection with a connector on the high voltage interface 214. Scaled analog signals from the high voltage interface 214 are provided to an A/D converter port **302*c* by way of an analog sense signal interface 336. The analog sense signal interface 336 low pass filters the scaled analog input signals prior to their provision to the A/D converter port 302*c*. Digital signals from the high voltage interface 214 are provided to the bus 304 via a digital sense signal interface 338. The digital sense signal interface 338** buffers the input signals and removes extraneous transitions from these input signals.

Control signals from the microprocessors general I/O port **302*d* are provided to the high voltage signal interface connector 326 by way of a relay control signal interface 340. The relay control signal interface converts the voltage levels of the I/O control signals to those used by the high voltage interface 214. A speaker driver 342 is connected to the General Purpose Timer (GPT) port 302*e* of the microprocessor 302. The processor 212 also includes a power supply 344 which provides regulated power to each of the circuit elements of FIG. 3 as needed. The high voltage interface 214 provides an unregulated power supply and the main 5 volt power supply for the processor 212**.

Figure 4:
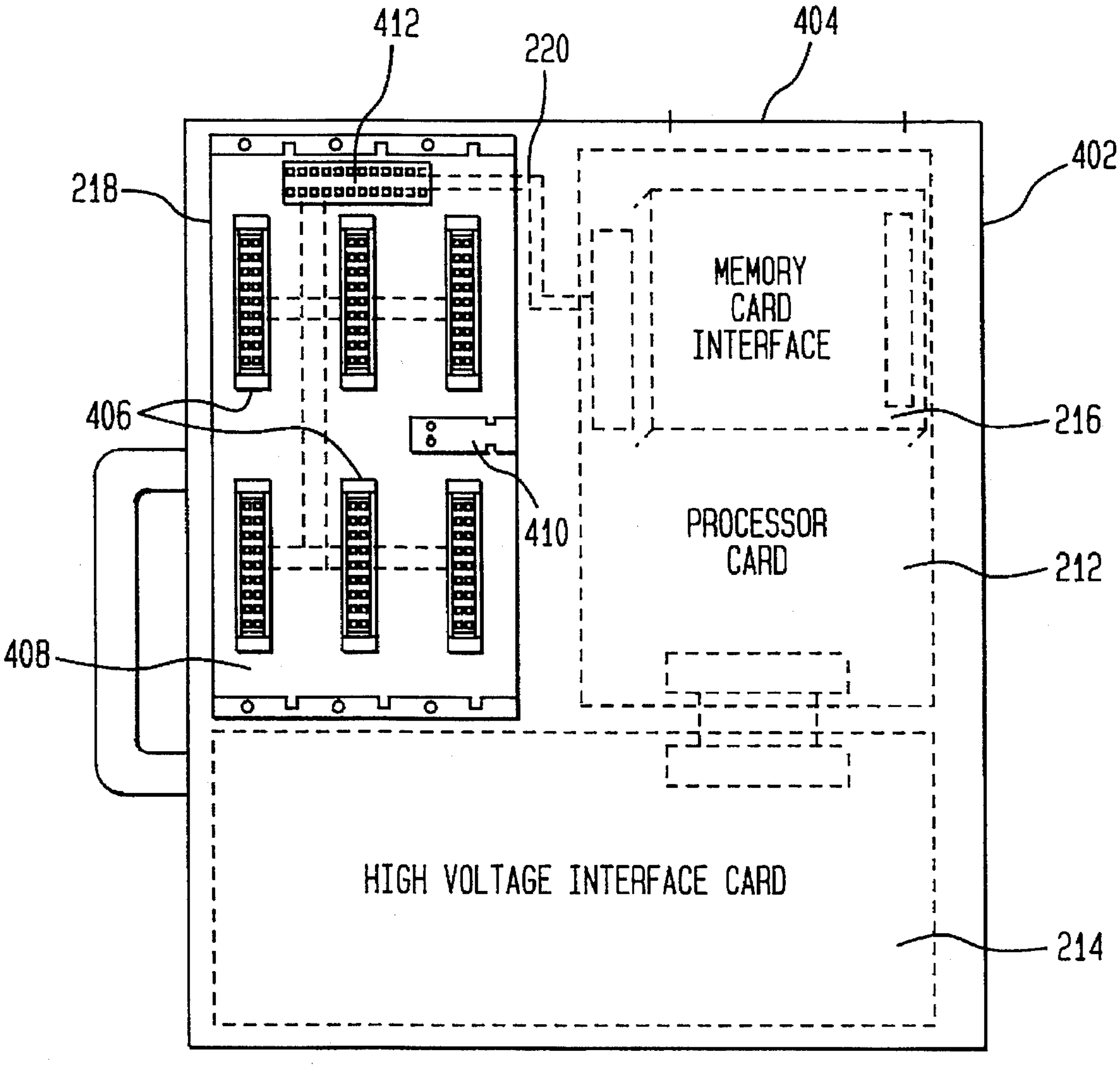
FIG. 4 shows a housing assembly for the voltage regulator controller and expansion chassis.
Figure 5B:
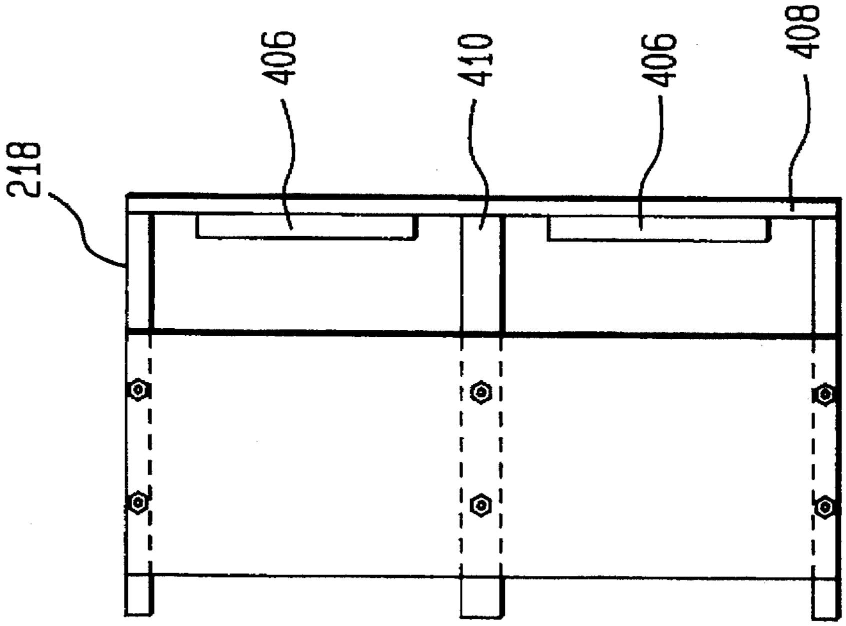
FIGS. 5A & 5B are, respectively, front and side views of the expansion chassis.
Figure 5A:
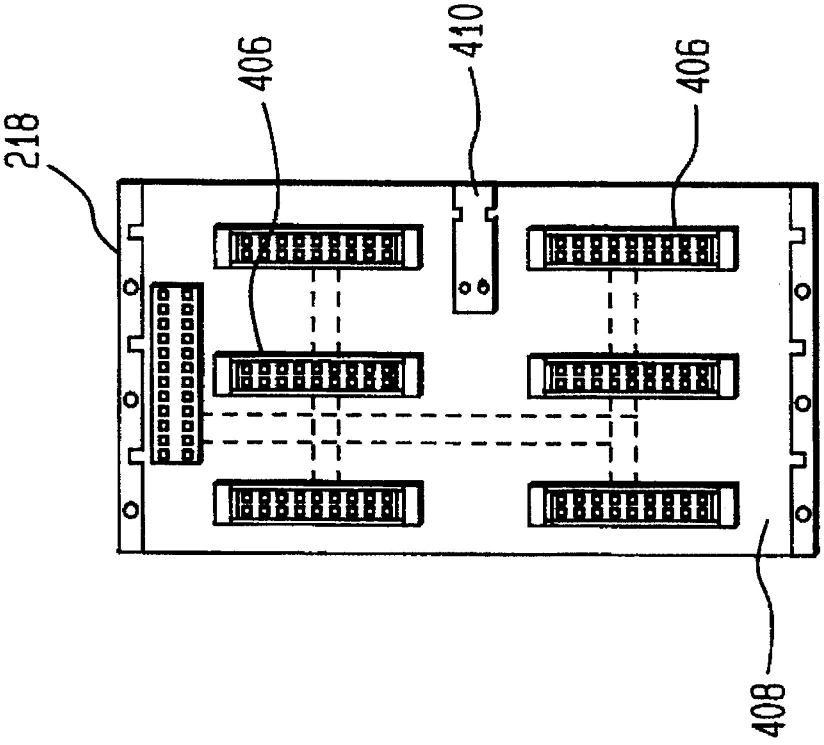
Figure 6A:
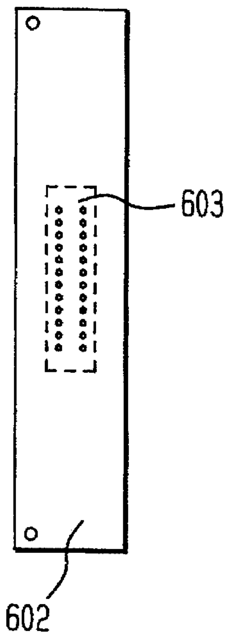
FIGS. 6A–6D are, respectively, front, right-side, rear and exploded views of a single height I/O module suitable for mounting in expansion chassis of FIGS. 4, 5A and 5B.
Figure 6B:
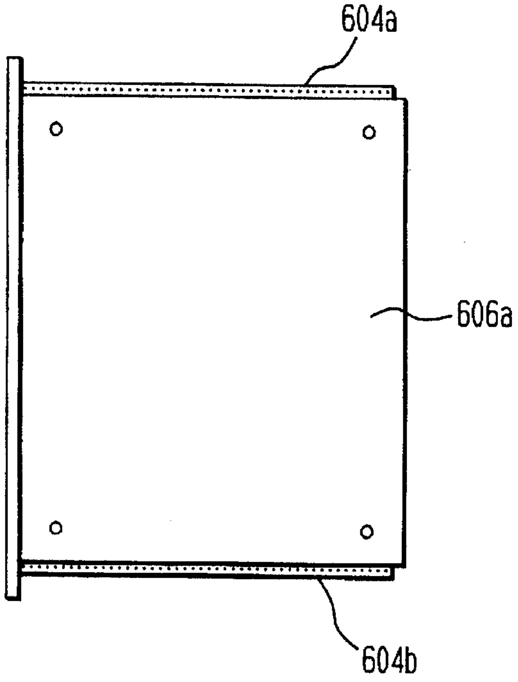
Figure 6C:
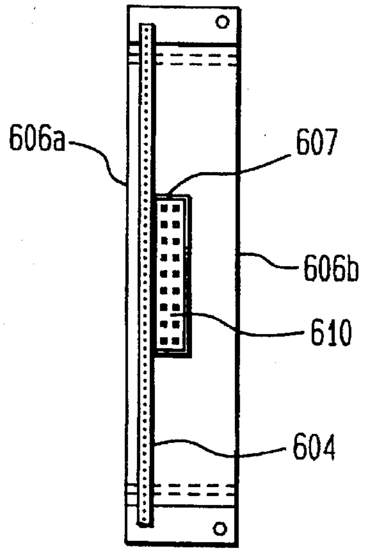
Figure 6D:
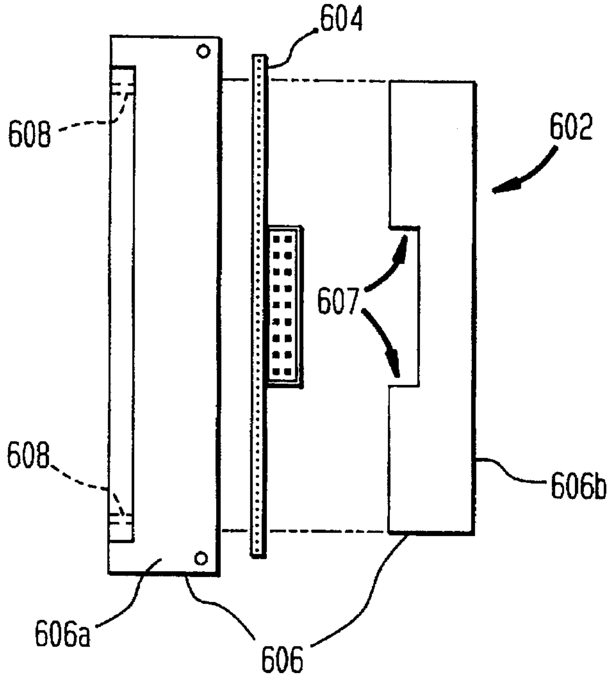

A housing assembly 402 suitable for housing the voltage regulator controller circuitry, is illustrated in FIG. 4. The processor 212, high voltage interface 214 and memory card interface 216 each reside on their own printed circuit boards and are electrically and logically interconnected by connectors. The housing assembly 402 also has an externally accessible slot 404, via which a memory card can be plugged into the memory card interface 216.

The I/O expansion section chassis 218 is secured within the housing (e.g. by screws) and is coupled to the processor 212 via the SPI bus 220. The I/O expansion chassis 218 includes six connectors 406 to receive I/O modules. The connectors 406 are connected to the SPI bus 220 and couple the I/O modules to the SPI bus when they are plugged into the chassis.

The SPI bus 220 and the connectors 406 for receiving the plug-in I/O modules bus are carried on a backplane 408, which is secured to the chassis frame by way of screws. Front and side views of the I/O expansion chassis are shown, respectively, in FIGS. 5A and 5B.

The I/O expansion chassis 218 can receive two types of modules: double height modules which contain two circuit boards; and single height modules which contain one circuit board. A removable guide 410 (which is attached to the chassis by way of screws) enables a user to configure the chassis for single height modules, double height modules or a combination of both as needed.

As illustrated in FIGS. 6A–6D the single height I/O modules 602 are of a clamshell design wherein the printed circuit board 604 having the I/O module logic is sandwiched in between two halves **606*a*, 606*b* of a metal shell or casing 606. The casing can be provided with ventilation holes (not shown) for ventilation and cooling of the printed circuit board 604. Threaded, press-in standoffs and screws 608 hold the printed circuit board in place and capture the printed circuit board securely between the shell halves. The common ground of the printed circuit board can be connected to the shell 606 via the standoffs 608 if desired. A connector 610, such as a dual-row square pin socket connector, is attached to the circuit board. The connector 610 is recessed in the shell 606 and accessible through an opening 607. The connector mates with a mating connector 406 in the I/O expansion chassis to bring the I/O card signals out to the SPI bus. One or more additional connectors 603 can be provided on the front of the module 602** for connection to an external device. For example, an communication module can be provided with a DB-25 connector for connection to an RS-232 port of a computer or modem.

The upper and lower edges **604*a*, 604*b* of the printed circuit board 604 extend beyond the periphery of the shell 606. This exposed portion of the printed circuit card is used to register the module in the expansion chassis. Connectors 406 in the expansion chassis are positioned to received the board 604 such that the connector will mate with its mating connector in the I/O expansion chassis when the I/O module is plugged in. Plugged-in I/O modules 602 can be further secured to the I/O expansion chassis 218** via screws.

Figure 7C:
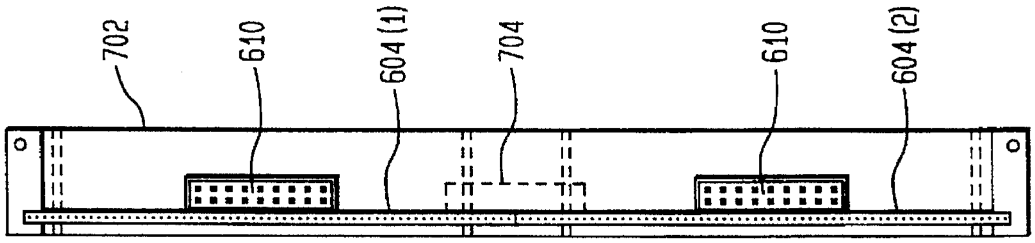
FIGS. 7A–7C are, respectively, front, right-side and rear views of a double height I/O module suitable for mounting in expansion chassis of FIGS. 4, 5A and 5B.
Figure 7B:
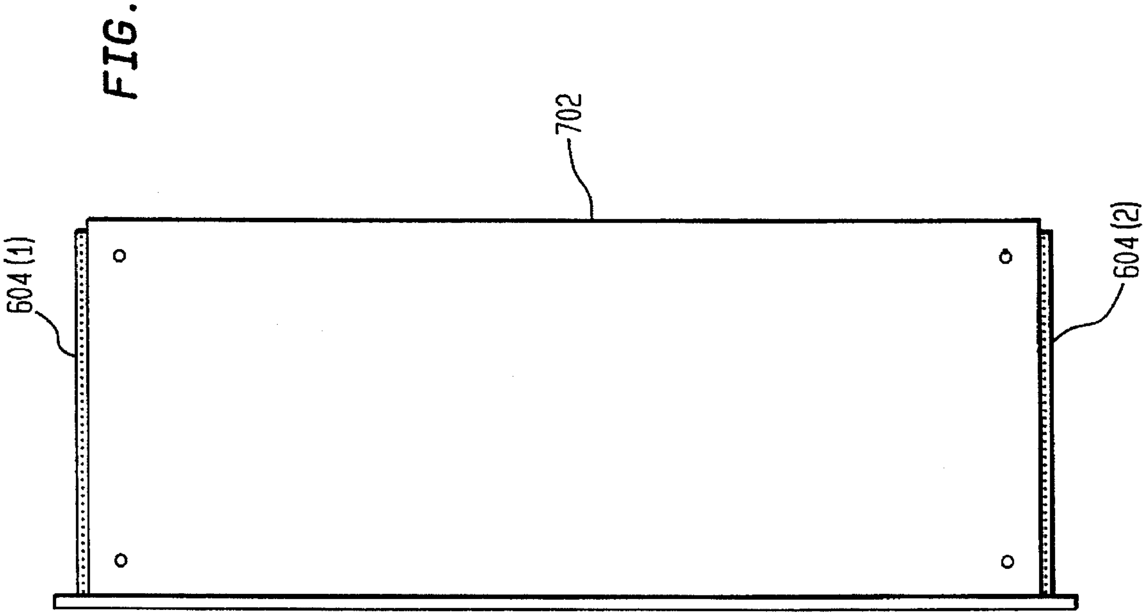
Figure 7A:
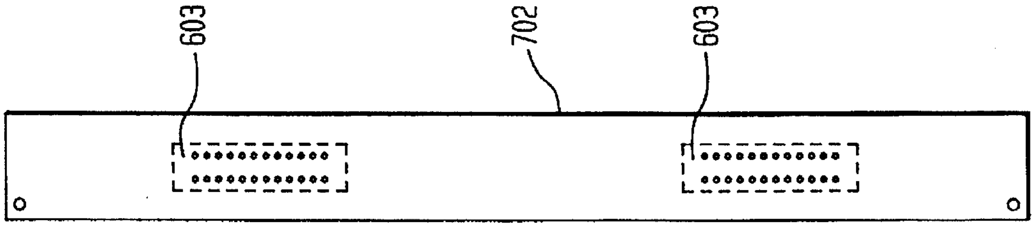

A double height module is illustrated in FIGS. 7A–7C. The double height module 702 is approximately twice the size vertically as the single height module of FIG. 6. Like the module of FIG. 6, the double height module is of a clamshell design and may include one or more additional connectors 603 on the front of module 702 for connection to an external device. In contrast to the single height module, however, the double height module contains two printed circuit boards 604(1), 604(2) having the I/O module logic which can be connected by means of a pluggable flat cable 704. The pluggable cable enables the two circuit boards to function either separately (each having its own function), or as a unit and further enables replacement of one board independent of the other. As with the module of FIG. 6, the circuit boards 604(1), 604(2) extend beyond the periphery of the housing shell. Each circuit board includes its own connector 610 which mates with a connector in the expansion chassis when the module is plugged in.

The microprocessor 302 determines which devices are present in the I/O expansion chassis 218 by executing a polling sequence when the controller 210 is initialized. At initialization, the microprocessor 302 polls the SPI bus 220. Each device present in the expansion chassis responds with a code indicative of what type of device it is. The microprocessor 302 compares this code with a look up table in the EEPROM 306 to determine what type of device has responded and which task should be used to handle the device. The microprocessor then activates the appropriate task (determined from the look-up table) and passes it the address of the device. In addition, the code indicative of the presence and identity of the device in the expansion chassis 218 can be transferred to the memory card interface 216 to be collected by the memory card 222 when it is plugged into the memory card interface 216. As is known in the art, polling information can include additional configuration data depending on the complexity of the device.

Advantageously, both the I/O expansion chassis 218 and the modules 602, 702 are field installable. The controller chassis 404 includes an otherwise unused area for receiving the I/O expansion chassis 218. In order to install the chassis 218, the field engineer powers down the controller 210, places the chassis into the area provided and secures the chassis 218 to the controller housing 402 by way of screws. The field engineer then connects the SPI bus 220 to the expansion chassis 218 by installing a cable between the expansion connector 328 on the processor board 212 and a connector 412 on the I/O expansion chassis. The field engineer then installs I/O modules 602, 702 as needed and powers on to the controller. This causes the controller to reinitialize and the microprocessor to start the polling sequence described above.

Once the expansion chassis 218 has been installed, I/O modules 602, 702 can be installed as needed. Just as for the installation of the chassis itself, the controller 210 is powered down prior to installation and then repowered after installation. This causes re-initiation of the polling sequence so that the presence of any added modules can be detected.

Now that the invention has been described by way of the preferred embodiment, various modifications, enhancements and improvements which do not depart from the scope and spirit of the invention will become apparent to those of skill in the art. Thus, it should be understood that the preferred embodiment has been provided by way of example and not by way of limitation. The scope of the invention is defined by the appended claims.

We claim:

1. A step-type voltage regulator comprising:

a multi-tap transformer;

an electrically controllable tap changer coupled to the multi-tap transformer;

a voltage regulator controller, coupled to and operating the tap changer, having:

a housing;

processor means, mounted in the housing, for generating tap control signals for the tap changer;

a field-installabte I/O expansion chassis mounted in the housing and coupled to the processor, the I/O expansion chassis having a plurality of connectors;

a plurality of types of modules comprising electronic circuitry which may be selectively coupled to at least one of the I/O expansion chassis connectors; and program means, executable by the processor means, for enabling the processor means to detect when a module is coupled to a connector of the I/O expansion chassis and for modifying the operation of the processor, by incorporating the module electronic circuitry into the controller, in response to detection of the module.

2. The voltage regulator controller of claim 1 further comprising a real-time clock coupled to the processor and the I/O expansion chassis.

3. The voltage regulator of claim 1 wherein the expansion chassis and real-time clock are coupled to the processor by way of a common bus.

4. The voltage regulator of claim 1 wherein the processor further comprises means for determining an identity of the module.

5. The voltage regulator of claim 1 further comprising an externally accessible memory card interface and means for sending data indicative of the presence and identity of the module to the memory card interface.

6. The voltage regulator of claim 1 where the I/O expansion chassis further comprises a removable guide for dividing the chassis into a plurality of openings having different dimensions for securing different sizes of the modules to the chassis.

7. A step-type voltage regulator comprising:

a multi-tap transformer;

an electrically controllable tap changer coupled to the multi-tap transformer;

a voltage regulator controller coupled to and operating the tap changer, having:

a housing;

processor means, mounted in the housing, for generating tap control signals for the tap changer;

a field-installable I/O expansion chassis mounted in the housing and coupled to the processor, the I/O expansion chassis having a plurality of connectors;

a real time clock coupled to the processor and the I/O expansion chassis;

a plurality of types of modules comprising electronic circuitry which may be selectively coupled to at least one of the I/O expansion chassis connectors; and program means, executable by the processor means, for enabling the processor means to detect when a module is coupled to a connector of the I/O expansion chassis, for determining an identity of the module and for modifying the operation of the processor, by incorporating the module electronic circuitry into the controller, in response to detection of the module and determination of the identity of the module.

8. The voltage regulator of claim 7 further comprising an externally accessible memory card interface and means for sending data indicative of the presence and identity of the module to the memory card interface.

9. The voltage regulator of claim 8 wherein the I/O expansion chassis further comprises a removable guide for dividing the chassis into a plurality of openings having different dimensions for securing different sizes of the modules to the chassis.

10. The voltage regulator of claim 8 wherein the module comprises:

a first shell half having an integral standoff insulator and at least one opening formed therein;

a circuit board mounted on the standoff insulator and having edges extending beyond the first shell half, the circuit board also having a connector extending through the opening when the circuit board is mounted in the first shell half; and a second shell half connected to the first shell half such that the circuit board is sandwiched between the first and second shell halves.

11. An I/O expansion module for insertion into an I/O expansion chassis of a voltage regulator controller, comprising:

a first shell half having an integral standoff insulator and at least one opening formed therein configured for insertion into an I/O chassis of a voltage regulator controller;

a circuit board, having electronic circuitry for operation in conjunction with a voltage regulator controller, mounted on the standoff insulator and having edges extending beyond the first shell half, the circuit board also having a connector extending through the opening when the circuit board is mounted in the first shell half for coupling the module electronic circuitry to the controller upon identification thereof by the controller; and a second shell half connected to the first shell half such that the circuit board is sandwiched in between the first and second shell halves.

12. The expansion module of claim 11 wherein the circuit board is electrically connected to the standoff insulator.

13. A kit of parts for modifying the functionality of a voltage regulator controller at a field site, the voltage regulator controller for use with a step-type voltage regulator having an electrically controllable tap changer, the voltage regulator controller having a housing; processor means, mounted in the housing, for generating tap control signals for the tap changer; the kit of parts comprising:

a field-installable I/O expansion chassis having a plurality of connectors, for installation in the housing;

a plurality of types of I/O modules, for operation in conjunction with a voltage regulator controller, comprising electronic circuitry which may be selectively coupled to at least one of the I/O expansion chassis connectors; and program means, executable by the processor means, for enabling the processor means to detect when an I/O module is coupled to the I/O expansion chassis and for modifying the operation of the processor, by incorporating the module electronic circuitry into the controller, in response to detection of the I/O module.

14. The kit of parts of claim 13 wherein the processor further comprises means for determining an identity of the I/O module.

15. The kit of parts of claim 13 further comprising an externally accessible memory card interface and means for sending data indicative of the presence and identity of the I/O module to the memory card interface.

* * * * *